United States Patent [19]

Haddad et al.

[11] 4,219,407
[45] Aug. 26, 1980

[54] FLUID CRACKING PROCESS AND THE METHOD FOR SEPARATING A SUSPENSION DISCHARGED FROM A RISER CRACKING ZONE

[75] Inventors: James H. Haddad, Princeton Junction, N.J.; Scott A. Heffley, Bolingbrook, Ill.; Hartley Owen, Seven Oaks, England

[73] Assignee: Mobil Oil Corporation, New York, N.Y.

[21] Appl. No.: 871,044

[22] Filed: Jan. 20, 1978

Related U.S. Application Data

[63] Continuation-in-part of Ser. No. 728,100, Sep. 30, 1976, abandoned.

[51] Int. Cl.² ............ B01D 45/06; B01J 37/14; C10G 11/18
[52] U.S. Cl. ............................ 208/151; 55/17; 55/461; 55/466; 208/153; 208/161; 208/164; 252/417
[58] Field of Search ............ 208/153, 161, 164, 150, 208/151; 55/461, 17, 466; 252/417

[56] References Cited

U.S. PATENT DOCUMENTS

| | | | |
|---|---|---|---|
| 2,888,096 | 5/1959 | Evans | 208/153 |
| 3,261,776 | 7/1966 | Baumann et al. | 208/153 |
| 4,035,284 | 7/1977 | Gross et al. | 208/164 |

Primary Examiner—Herbert Levine
Attorney, Agent, or Firm—Charles A. Huggett; Raymond W. Barclay

[57] ABSTRACT

A riser cracking-catalyst regeneration operation is described wherein a suspension discharged from a riser operation is separated by catalyst particle concentrating means which discharge a concentrated stream of catalyst separated from gasiform material into a downcomer zone and out of further contact with discharged gasiform material in the suspension. A stripping gas is used to particularly aid the separation of catalyst and hydrocarbon vapors.

11 Claims, 3 Drawing Figures

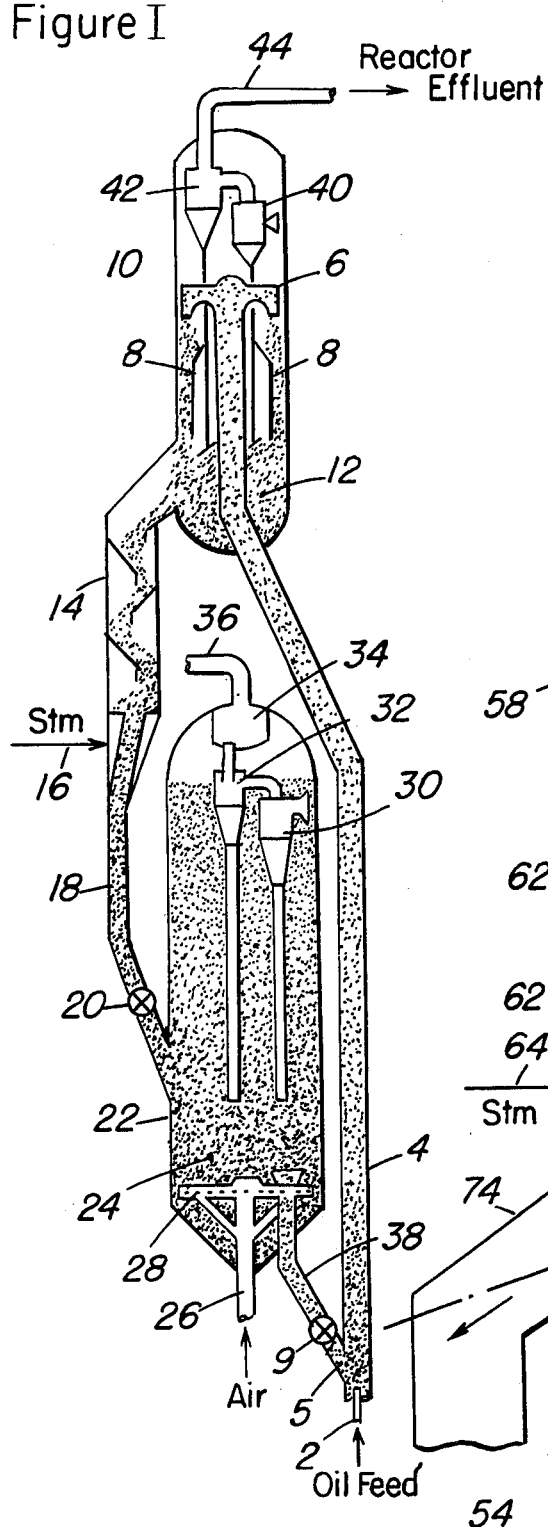
Figure I
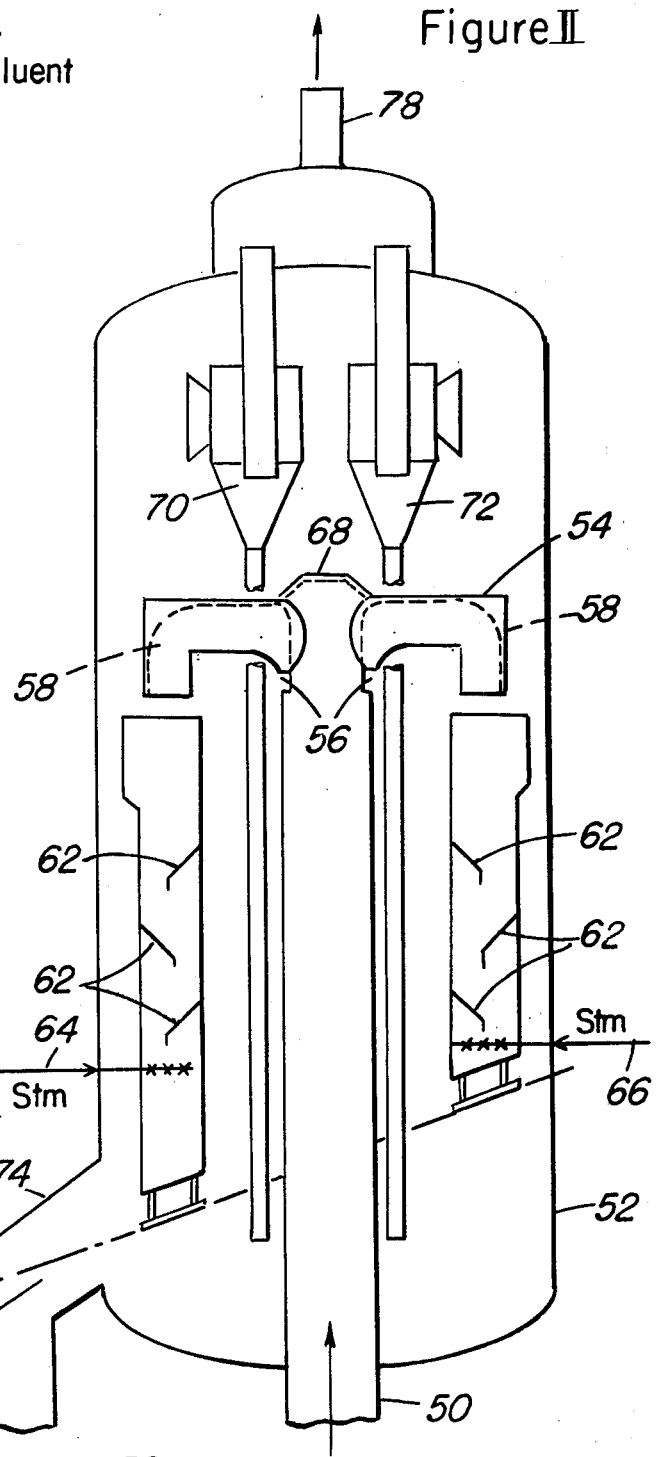
Figure II
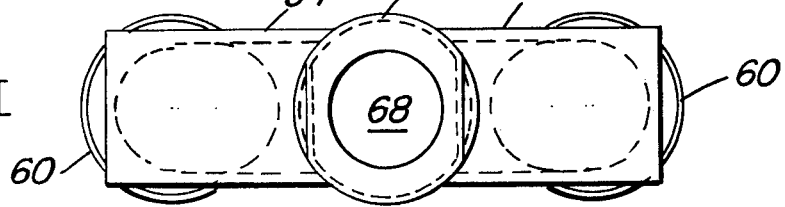
Figure III

FLUID CRACKING PROCESS AND THE METHOD FOR SEPARATING A SUSPENSION DISCHARGED FROM A RISER CRACKING ZONE

This application is a continuation-in-part of application Ser. No. 728,100, filed Sept. 30, 1976 now abandoned.

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts, new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with improving the technique of using a low coke producing crystalline zeolite hydrocarbon conversion catalyst.

SUMMARY OF THE INVENTION

The present invention relates to the conversion of hydrocarbon feed materials in the presence of high activity fluidizable crystalline zeolite containing catalyst particles and the regeneration of the catalyst particles to remove deactivating coke deposits by burning. In a more particular aspect the present invention is concerned with the method and system for separating fluidizable catalyst particles from gasiform products and particularly from a high activity crystalline zeolite cracking catalyst under more efficient separating conditions reducing the overcracking of conversion products and promoting the recovery of desired products of a hydrocarbon conversion operation. In yet another aspect, the invention is concerned with a particular relationship of operating parameters coupled in a manner promoting a suspended catalyst phase removal of deactivating deposits of carbonaceous material from high activity hydrocarbon conversion catalyst particles and heating thereof to an elevated temperature. In a more particular aspect the invention is concerned with the separation and recovery of entrained catalyst particles from gasiform products of a riser regeneration operation and a short contact time riser hydrocarbon conversion operation.

The hydrocarbon conversion catalyst employed is preferably a high activity crystalline zeolite catalyst of fluidizable particle size which is transferred in suspended or dispersed phase condition generally upwardly through one or more riser conversion zones providing a hydrocarbon residence time in each conversion zone in the range of 0.5 to about 10 seconds and more usually less than about 8 seconds. High temperature riser hydrocarbon conversions of at least 1000° F. at 0.5 to 4 seconds hydrocarbon residence time in contact with the catalyst in the riser is desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the catalyst conversion step. The entrained hydrocarbons are subjected to further contact with the catalyst until removed from the catalyst with mechanical means and stripping gas in a separated catalyst stripping zone. Hydrocarbon conversion products separated from the catalyst and stripped materials are combined and passed to a product fractionation step. Stripped catalyst containing deactivating amounts of carbonaceous material hereinafter referred to as coke is then passed to a catalyst regeneration operation.

A dense fluid catalyst bed regeneration operation identified with the present invention accomplishes the removal of coke or carbonaceous material deposited on the catalyst particles by burning in the presence of oxygen containing regeneration gas. The recovery of available heat through such a coke removal operation is an essential part of the cracking operation. The regeneration technique of this invention relies upon introducing deactivated catalyst into a dense fluid mass of catalyst fluidized by upflowing oxygen containing regeneration gas. This dense fluid mass of catalyst is superimposed by a more dispersed catalyst phase. A relatively high temperature profile is maintained in the catalyst regeneration operation. The upwardly flowing regeneration gas velocity fluidizing the mass of catalyst being regenerated is maintained within the range of 1 to 3 ft./second to obtain the desired contact of catalyst with oxygen containing regeneration gas in an upper portion thereof to particularly accomplish combustion of carbon monoxide in the combustion gases.

The high temperature profile of the regeneration operation is promoted by mixing hot catalyst comprising carbonaceous material recovered from a stripping operation with a portion of a dense fluid bed of regenerated catalyst so that upon contact with preheated oxygen containing regeneration gas such as air, combustion of carbonaceous deposits is rapidly promoted.

A significant observation contributing to the operational concepts of this invention is the further finding that a carbon monoxide oxidation promoter may be added to the catalyst to be regenerated to promote the recovery of available heat by promoting the burning of carbon monoxide to carbon dioxide. In either a single zeolite catalyst conversion operation or one employing both a large and smaller pore crystalline zeolite, the oxidation promoter may be charged to the catalyst in any one of several different methods. In one arrangement the oxidation promoter may be admixed with the smaller pore zeolite component alone. The oxidation promoter may be added to a stream of catalyst separated from a catalyst stripping zone, in a riser contact zone maintained in the upper portion of the stripper zones to a make up stream of catalyst, directly to the coked catalyst in the stripping zone of the hydrocarbon conversion operation. It is further contemplated maintaining the temperature of any one of the above separated catalyst streams below about 500° F. when contacted with the oxidation promoter. It is also contemplated adding the oxidation promoter in a relatively dilute liquid form by spraying it directly into the bed of catalyst in the regeneration zone. The combination operation of the present invention lends itself particularly well to obtaining a good mixing of the oxidation promoter by adding it to an area of relatively high turbulence promoting good mixing such as found immediately downstream or in the throat of the spent catalyst flow control valve in the spent catalyst standpipe. The oxidation component added may be one selected from the group of metals and compounds thereof such as copper, nickel, chromium, manganese oxide, copper chromite and platinum group metals such as platinum, palladium, iridium, osmium, rhodium, ruthenium and rhenium. The amount of promoter added will vary with the component selected. It is preferred that a relatively small amount of oxidation promoter be added and the component selected should be one which does not undesirably affect the hydrocarbon conversion operation. A particularly useful component which may be added in small amounts for promoting the combustion of carbon monoxide in an oxidizing atmosphere is one of either platinum or palladium. When a small pore crystalline zeolite such as a ZSM-5 crystalline zeolite is employed with a larger pore zeolite such as a faujasite crystalline zeolite cracking component, the metal oxidation promoter may be added to the mixture or to the small pore crystalline zeolite alone with beneficial results since it does not coke deactivate as readily as the larger pore zeolite. It is important to use the metal carbon monoxide oxidation promoter in a manner which will expose it to carbon monoxide formed during burning of the carbonaceous deposits with the oxygen containing regeneration gas. One suitable method for accomplishing this purpose is to apply the oxidation promoter directly to the coked surface of the deactivated or spent catalyst prior to introduction thereof to the regeneration zone. This may be accomplished by any one of the methods identified above, it being preferred to add the promoter to a cool stream of catalyst passed to regeneration. The addition of an oxidation promoter may be in amounts within the range of 0.1 to 100 parts per million of oxidation metal component based on the final catalyst composition employed. For platinum group metals it is preferred to employ less than 10 parts per million of the oxidation promoter based on the catalyst composition. The platinum group metal may be added to or present with the cracking catalyst as the metal, oxide, sulfide, halide, sulfate or carbide form.

The regeneration zone or regeneration vessel may take on substantially any shape generally cylindrical as shown in the attached drawing or it may be of the more modern design which is of large diameter in a bottom portion and tapered or otherwise altered to a smaller diameter in an upper portion thereof to provide a generally upflowing catalyst regeneration operation. The regeneration zone is preferably one which will provide the operating parameters herein defined.

The regeneration technique and system of this invention is aided to some considerable extent by mixing regenerated catalyst particles with coke deactivated catalyst particles in a ratio particularly promoting coke burning temperature conditions. A dense catalyst bed phase regeneration system superimposed by a more dispersed phase of catalyst particles may be relied upon for promoting the burning of coke and formed CO to $CO_2$. This is particularly desired along with the recovery of heat thus generated by the catalyst particles dispersed in upflowing combustion gas and products thereof. In such an upflowing catalyst regeneration operation, an oxygen containing regeneration gas stream is introduced to the bottom portion of a catalyst bed for flow upwardly through the mass of catalyst comprising both spent and regenerated catalyst in the dense bed of catalyst under carbon burning conditions. Secondary regeneration gas may be added, if desired, to an upper portion of the large dense means of catalyst or a dispersed phase thereabove in the regeneration zone. Preheating of the regeneration gas stream is particularly desirable before contact with the low coke producing crystalline zeolite catalyst so that the regenerated catalyst will not be undesirably cooled and a combustion temperature of at least 1175° F. in the dense fluid bed of catalyst in the regenerator will be rapidly attained.

In the arrangement of the present invention, it is contemplated supplementing residual carbonaceous material such as coke transferred to the regeneration system by the introduction of torch oil thereto. In a particular aspect it is contemplated adding torch oil alone or in admixture with an oxidation promoter discussed above to the spent catalyst passed to the regenerator or directly into the dense fluid bed of catalyst in the regenerator. It is also contemplated adding the torch oil to a regeneration air line burner exit to aid with vaporization of the torch oil.

It will be recognized from the discussion herein provided that a relatively delicate balance in operating parameters is maintained to obtain desired burning of available coke, burning of carbon monoxide in either the dense or dispersed catalyst phases in the combustion flue gases and the recovery by the catalyst of the available heat thus generated in the operation. The operating restrictions and parameters herein identified are dictated in substantial measure by the hydrocarbonaceous material containing spent catalyst obtained from the hydrocarbon conversion operation herein described.

In the hydrocarbon conversion portion of the combination operation of this invention, it is desired to employ a high activity crystalline zeolite conversion catalyst such as a faujasite "Y" zeolite containing cracking catalyst alone or in admixture with a smaller pore zeolite such as a ZSM-5 class of crystalline zeolites. The hydrocarbon conversion operation is preferably a dispersed catalyst phase riser conversion operation of limited or restricted hydrocarbon contact time between catalyst and hydrocarbon reactant selected to particularly promote the formation of desired products including gasoline boiling range materials as well as lighter and higher boiling product materials. Thus it is contemplated practicing the conversion of gas oil feeds and higher boiling hydrocarbon materials in a single riser reactor employing temperatures in excess of 900° F. and as high as 1050 or 1100° F. In such hydrocarbon conversion operations, the catalyst-hydrocarbon residence time in a riser reaction zone is usually restricted to less than 15 seconds and is desirably restricted depending on reaction temperature and feed composition to within the range of 0.5 to about 8 seconds hydrocarbon residence time. For the high temperature operations it is preferred to restrict the hydrocarbon residence time in contact with catalyst within the range of 1 to 5 seconds and to minimize overcracking of desired products by effecting a rapid separation of the suspension substantially immediately upon discharge from the riser conversion zone. Thus an important aspect of this invention is concerned particularly with an apparatus modification and operating technique or method for obtaining a rapid separation of a hydrocarbon/catalyst suspension discharged from a high temperature riser cracking zone.

The present invention is concerned with separating a suspension discharged from a riser contact zone under conditions restrictively collecting the catalyst particles in a zone separate from discharged gasiform material and altering the flow direction of the collected catalyst particle to flow out of contact with gasiform material as a downwardly confined stream. The collected and confined catalyst particles stream thus separated, as for example from hydrocarbon products of catalytic conversion, are discharged into an open ended restricted downflow passageway wherein the catalyst particles are maintained out of contact with hydrocarbon vapors. The downflow collected catalyst passageway referred to herein as a restricted downcomer zone is positioned beneath the catalyst separation and collection means so that the separated and confined catalyst stream is maintained out of further contact with discharged hydrocarbon conversion vapors during transfer to a catalyst stripping zone. By employing the concepts of this invention a vessel means housing the upper end of a riser reactor or riser catalyst regenerator may be reduced in cross-section since the catalyst radiating arm separating arrangement herein described will occupy less space than cyclonic separators attached to the end of the riser reactor. In the arrangement of this invention, the downcomer zone of restricted cross-sectional dimensions may be attached adjacent to the wall of the riser, to the wall of the housing vessel or in some cases positioned intermediate there between. In any of the arrangements selected it is important to bear in mind that minimizing the size of the housing vessel minimizes catalyst hold up. It is important, however, to provide space adjacent the riser outlet and beneath the disengager arm sufficient for discharged hydrocarbon vapors to rapidly disassociate and separate from suspended catalyst forming the confined collected catalyst stream discharged into the downcomer zone. The continued contact of hydrocarbon vapors with catalyst discharged from the riser is avoided to some considerable extent by the separation and catalyst collecting arrangement of this invention. The suspension separation arrangement herein identified can be further improved by the proper use of stripping gas. For example, stripping gas may be passed upwardly through areas of catalyst concentration as well as in the area relied upon for effecting the separation of hydrocarbon vapors from catalyst immediately after discharge from the riser. The arrangement of separation apparatus of this invention tends to minimize the downward thrust of separated hydrocarbon vapors and this can be further offset by the use of upflowing stripping gas. Therefore, it is contemplated employing stripping gas adjacent the catalyst inlet to the downcomer zone for flow in the free space between the downcomer zone and the suspension outlet adjacent the upper discharge end of the riser reactor. Stripping gas employed as herein discussed is recovered from the stripping zone and passes upwardly through the housing vessel and into the cyclonic separators through which hydrocarbon vapors are recovered and positioned in the upper part of the vessel above the riser discharge.

DISCUSSION OF SPECIFIC EMBODIMENTS

FIG. 1 presents diagrammatically in elevation one arrangement of apparatus for accomplishing the catalyst conversion of hydrocarbons and the regeneration of catalyst particles in accordance with the concepts of this invention.

Referring now to the FIG. I, a hydrocarbon feed such as gas oil alone or in admixture with a higher or lower boiling feed material is introduced by conduit 2 to the bottom of a riser conversion zone 4. Hot regenerated catalyst in conduit 5 provided with flow control valve 9 enters the bottom portion of riser 4 for admixture with the oil feed to form a catalyst-oil suspension at an elevated conversion temperature of at least about 900° F. and more usually at least 980° F. or 1000° F. The suspension formed is passed upwardly through the riser conversion zone 4 under elevated temperature hydrocarbon conversion conditions preferably at least 980° F. promoting the cracking of the oil feed to lower and higher boiling products including depositing carbonaceous material on the catalyst. The gasiform products include gasoline, boiling hydrocarbons, fuel oils and normally gaseous hydrocarbon products. The gasiform hydrocarbon material with suspended catalyst particles may be maintained in the riser conversion zone for a hydrocarbon residence time within the range of 0.5 to 10 seconds. However, a hydrocarbon residence time within the range of 0.5 to about 4 seconds may be employed with particular advantage when using hydrocarbon conversion temperatures of at least 1000° F. and up to about 1150° F. The suspension passed upwardly in the riser is discharged from the upper end of the riser conversion zone through peripheral openings positioned beneath two or more horizontally radiating catalyst collecting arms 6. The arms are provided with a curved inner surface promoting cyclonic separation of catalyst particles from hydrocarbon vapors. A further modification to this discharge arrangement is particularly shown in FIGS. II and III. Radial extending arms 6 provided with a curved inner surface and catalyst particle confining sidewalls is arranged to impart a cyclonic concentration of catalyst particles promoting a forced separation from hydrocarbon vapors discharged as a suspension from the riser conversion zone. This cyclonic collection and concentration of catalyst particles is used to reverse the flow of the separated catalyst such that it is concentrated as a downwardly flowing confined stream which discharges generally downwardly and into the open upper end of a catalyst downcomer chamber 8. In the arrangement of FIG. I, chamber 8 is shown positioned adjacent to the wall of vessel 10. The downcomer chamber 8 may be cylindrical, rectangular, semi-cylindrical or any other suitable shape which will separately retain the downwardly discharged catalyst stream in the confined zone comprising the downcomer chamber and out of significant further contact with hydrocarbon vapors. In the arrangement shown, it is essential that adequate vapor disengaging space be provided beneath arms 6 at the riser outlet and adjacent the area of catalyst centrifugal separation which will particularly promote the removal of separated vapors from out of contact with discharged catalyst.

Separation of hydrocarbon vapors from the riser discharged suspension is aided in considerable measure by enlarging the riser peripheral discharge opening beneath arm 6 referred to above so that its cross-sectional area is at least 1.5 times the cross-sectional area of the riser conduit. Thus the combination of the inverted channel members open on its bottom side forming arm 6 with the enlarged vapor disengaging space beneath the disengaging arm particularly facilitates the rapid separation of vaporous hydrocarbon material from suspended catalyst particles.

In the arrangement of FIG. I, the catalyst collected in downcomer chamber 8 is caused to flow to the lower portion of the housing vessel or chamber 10 wherein a mass of separated catalyst 12 is collected. This mass of collected catalyst may be fluidized with a stripping gas such as steam introduced to a bottom portion of the vessel by means not shown or the mass of catalyst may be caused to flow into a separate external but adjacent stripping vessel 14 as shown in FIG. I. It is contemplated as shown in FIG. II of introducing stripping gas to a lower portion of the downcomer chamber 8 for upflow therethrough. Stripping chamber 14 is particularly provided and supplied with stripping gas by conduit 16. The stripping chamber is provided with a plurality of downwardly sloping baffle members which provide a tortuous path for downflow or catalyst countercurrent to upflowing stripping gas. Depending on the riser conversion temperature the catalyst in stripping zone 14 is stripped at a temperature which is from 50 to about 150 degrees below the riser conversion temperature. It is preferred that stripping of the catalyst occur at an elevated temperature which is less than 100 degrees below the riser discharge temperature. The stripped catalyst is passed downwardly through a pressure building standpipe 18 containing flow control valve 20 to a catalyst regeneration zone 22. In the arrangement of FIG. I, the regeneration zone is shown positioned substantially vertically below housing vessel 10 which may or may not be on a common vertical axis as desired. In any event, the standpipe 18 discharges into a bed of catalyst maintained in the lower portion of regeneration zone 22 wherein it is maintained as a fluid bed of catalyst 24 in a lower portion of the regeneration vessel. Regeneration gas such as air or an oxygen supplemented gas stream is introduced by conduit 26 to a regeneration gas distributor manifold 28 positioned cross-sectionally in a lower portion of the dense fluid bed of catalyst in the regeneration zone. In the arrangement shown, the stripped catalyst is discharged into an upper portion of the fluid bed of catalyst for admixture with hot regenerated catalyst therein. The stripped catalyst may be introduced tangentially with respect to the regenerator cross-section and preferably above an intermediate portion of the bed of catalyst. In some arrangements, it may be desirable to introduce it to the bed of catalyst at its interface with a more dispersed phase of catalyst thereabove. During regeneration the carbonaceous material contaminated catalyst stripped of entrained hydrocarbon vapors is heated by admixture with regenerated catalyst and raised to a temperature sufficient to initiate burning of carbonaceous material thereby producing carbon monoxide as well as carbon dioxide containing flue gases. Carbon monoxide formed during the combustion of carbonaceous deposits by oxygen is desirably further oxidized to improve the heat recovery by the catalyst in the regeneration operation. The combustion of carbonaceous deposits will occur at a temperature above about 1150° F. and the regenerated catalyst will be heated during such combustion operations to a temperature within the range of 1300 to 1400° F. It is particularly desired to accomplish the above oxidation reactions comprising catalyst regeneration in the dense fluid phase of catalyst particles as well as in the more dispersed fluid phase of catalyst particles thereabove. It is particularly desired to minimize carbon monoxide combustion in the regenerator cyclone separators 30 and 32 in the upper portion of the regeneration zone 22 by effecting complete combustion of combustibles in the dense and dispersed catalyst phases. Cyclonic separators 30 and 32 are sequentially arranged for flow of flue gas therethrough. The flue gas separated from catalyst fines in each cyclone separator passes into a plenum chamber 34 before being withdrawn by conduit 36. Catalyst fines separated in the cyclonic separators are returned to the dense fluid bed of catalysts by suitably provided catalyst diplegs.

Regenerated catalyst at a temperature of at least about 1300° F. is withdrawn from a lower portion of the dense fluid bed of catalyst 24 as by conduit 38 provided with a catalyst flow control valve 9. The withdrawn regenerated catalyst is passed to the bottom lower portion of riser 4 for use as discussed herein before. The outlet to catalyst withdrawal standpipe 38 is shown positioned above manifold 28. However, the inlet may be positioned in another portion of the dense fluid bed of catalyst which will provide regenerated catalyst of desired characteristics for withdrawal therefrom. Provisions may be provided although not shown for adding a secondary regeneration gas stream to the fluid bed of catalyst above manifold 28 to assist with the removal of carbonaceous material from the catalyst particularly when discharging the catalyst adjacent the upper dense fluid catalyst bed interface. In any of the arrangements herein discussed it is important to promote the oxidation of carbon monoxide and this may be accomplished by the addition of a carbon monoxide oxidation catalyst promoter as herein described. The upper portion of vessel 10 is provided with sequentially arranged cyclonic separators 40 and 42 communicating with withdrawal conduit 44 for passing hydrocarbon vapors to a product fractionator not shown.

The present invention is particularly concerned with apparatus arrangements and concepts for effecting a rapid separation of a gasiform hydrocarbon material-catalyst suspension discharged from a riser conversion zone. The concepts of this invention find particular application in riser reactor and riser regenerator arrangements of the most recent and modern design particularly concerned with minimizing catalyst inventory in the system or apparatus employed as well as the contact time between gasiform reactant and catalyst. In such systems, the vessels and interconnecting piping are sized to accommodate a given capacity operation within the operating constraints desired and such a system of modern design often limits any excess space for additional separating equipment. The present invention is concerned with such systems and the arrangement of apparatus for particularly accomplishing a rapid separation of a suspension discharged from a riser reactor zone.

FIG. II shows one expanded specific arrangement of apparatus in elevation for effecting separation of a suspension discharged from a riser zone into a hopper vessel of restricted dimensions. It is not essential that the hopper vessel be so restricted in cross-sectional dimensions since the concepts of this invention may be broadly employed with equal advantage also in larger vessels.

In the arrangement of FIG. II there is shown diagrammatically the upper end of a riser hydrocarbon conversion zone 50 extending upwardly into a hopper vessel 52. The riser terminates in an upper intermediate portion of vessel 52 with a horizontal and shaped cross member arm referred to as a cross arm disengager means 54. The disengager arm means 54 is preferably a combination of two or more arms such as a plurality of arms extending generally horizontally outward from the upper capped end 68 of the riser. The disengager arm shaped as shown in FIGS. II and III extends outwardly from the riser above opening 56 in the upper periphery of the riser. The bottom side of the disengager arm is in open communication with vapor disengaging space therebelow and opposite outlets 56. The arms are provided with a downwardly sloping curved surface area 58 adjacent the outer ends thereof. Positions beneath and spaced apart or adjacent the disengager arm is an open ended catalyst collecting vessel 60 of cross-sectional dimensions adequate to retain the separated catalyst stream for unrestricted downflow therethrough. On the other hand, vessel 60 may be provided with a plurality of stripping trays 62. Stripping trays 62 may be solid baffle members or perforated baffle members to allow stripping gas to pass upwardly through or around the trays into contact with the catalyst. Conduit means 64 and 66 are provided for introducing stripping gas such as steam to a lower portion of the catalyst collecting vessel 60. As shown in the drawing the upper open end of the vessel 60 is enlarged to provide a funnel shaped collecting zone for catalyst discharged downwardly from the disengaging arm. This funnel arrangement should not be so large as to encourage entrainment of hydrocarbon vapors.

When using the apparatus of FIG. II, a suspension of fluidizable catalyst particles in gasiform material such as hydrocarbon vapors is caused to flow upwardly through riser 50 and outwardly through opening 56 beneath the disengaging arm 54. Since the top of the riser is capped by a solid member 68, the catalyst portion of the suspension is concentrated in the end thereof and caused to flow outwardly through arm 54 from opening 56. The discharged catalyst is particularly confined within the limits of the inverted "U" shaped disengaging arm 54 thereby forcing a separation of catalyst from hydrocarbon vapors. The abrupt change in direction of the suspension from vertical upflow to horizontal flow and then to a downflow pattern by internal curved surface 58 establishes a centrifugal moment of catalyst flow on the discharged catalyst thereby concentrating the catalyst particles on the upper side of arm 54 and along the curved surface 58 for discharge downwardly into the open upper end of vessel 60. The gasiform part of the suspension comprising hydrocarbon vapors thus centrifugally separated from entrained catalyst particles in the disengaging space provided in conjunction with centrifugal disengagement means moves out from under the open disengager arm into a lower velocity region and into an upper portion of the vessel of reduced gas velocity. The vapors thus separated pass upwardly to the inlet of cyclonic separating equipment 70 and 72 shown positioned in the upper part of vessel 52. Cyclone separators 70 and 72 may be single stages of cyclone separator or sequentially arranged primary and secondary stages of cyclonic separating equipment such as shown in FIG. I. Separated vaporous or gasiform material is withdrawn and passed to fractionation (not shown) by conduit 78. The cyclones may be located within the vessel as shown or outside the vessel if space is at a premium. The cyclones are provided with catalyst carrying diplegs which extend downwardly into a lower or bottom portion of vessel 52. The bottom open end of the dipleg may be immersed in a bed of catalyst particles collected in the lower portion of the vessel or they may terminate above the normal angle of repose of a bed of collected catalyst and be provided with spaced apart baffle means 80 supported by rod means 82 or flap valve means which retard the flow of catalyst and significant amounts of gasiform material passing upwardly through the downcomer. Catalyst particles collected in the lower portion of vessel 52 as a bed of catalyst may be withdrawn by side conduit means 74 as shown for passage to a stripping zone as shown in FIG. I. Vessel 52 may be modified in a bottom portion thereof to provide an elongated annular stripping zone about the riser before withdrawing stripped catalyst for passage to a catalyst regeneration zone. The arrangement of FIG. II is particularly concerned with providing separating means for reducing the contact time encountered between catalyst and hydrocarbon vapors after discharge from a riser conversion zone. The apparatus of FIG. II promotes the separation of catalyst from gasiform hydrocarbon vapors, the separate confinement of separated catalyst out of contact with hydrocarbon vapors and the removal of vaporous material from the segregated catalyst. This serves to significantly reduce undesired extended overcracking of products of the riser cracking zone.

In the combination operation of this invention, the efficient separation of catalyst from gasiform materials in the cyclonic separators is enhanced by employing gas velocities of at least 50 ft./sec. and preferably gas velocities of at least 60 ft./sec. The suspension separation arrangement at the riser outlet contributes in substantial measure to achieving the results desired as expressed above. This it is contemplated employing two or more disengaging arms, such as three or four equally spaced apart radially extending arms from the upper end of the riser. Also, the catalyst collecting or downcomer chamber may be an annular chamber when several disengaging arms are employed on a separate chamber associated with each arm is positioned to maximize the recovery of separated catalyst particles to the substantial exclusion of gasiform hydrocarbon product of riser conversion. The open ended catalyst collecting vessel is preferably hung with respect to the downwardly thrust catalyst stream to maximize vapor disengaging space adjacent the riser wall. Adequate vapor disengaging space provided below arms 56 and intermediate the downcomer vessel and the riser wall promotes the separation particularly desired. The particular location of the downcomer will depend on the length of the disengaging arm and the diameter of the hopper vessel about the upper end of the riser. In the arrangements herein identified substantial hydrocarbon vapor disengaging space is provided beneath the catalyst disengager arm, the top of the catalyst collecting chamber and the wall of the riser conversion zone so that the flow characteristics of the separated vaporous material may be substantially changed in direction and velocity from further contact with the catalyst.

FIG. III shows a top cross-sectional view of the riser 50 of FIG. II with two horizontally positioned disengager arms 54 in relationship to cylindrical catalyst collector downcomer vessels 60 positioned beneath the outer extremity of the disengager arm.

Having thus generally described the concepts of the present invention and described specific examples in support thereof, it is to be understood that no undue restrictions are to be imposed by reason thereof except as defined by the following claims.

We claim:

1. In a fluid catalyst process comprising cracking a suspension of hydrocarbon reactant and catalyst at a temperature above 950° F. in a riser conversion zone and thereafter regenerating catalyst recovered from said riser conversion zone to heat said catalyst and remove carbonaceous deposits before return to said riser conversion zone, the improvement for separating the hydrocarbon-catalyst suspension upon discharge from the riser conversion zone which comprises, discharging the suspension outwardly through openings in the upper periphery of the riser beneath radially extending restricted catalyst collecting passageways open on the bottom side thereof and providing a substantial confined catalyst stream generally separate from hydrocarbon vapors discharged from the riser beneath the confined catalyst stream, said catalyst collecting passageways curved downwardly adjacent the outer end thereof to induce a downward moment on said confined catalyst stream in said passageway sufficient to direct said stream downwardly into the open upper end of a catalyst downcomer passageway positioned to maintain catalyst so collected and directed separate from said discharged hydrocarbon vapors, and employing stripping gas to further promote the separation of catalyst and hydrocarbon vapors discharged from said riser.

2. The process of claim 1 wherein the hydrocarbon residence time in the riser conversion zone is restricted to within the range of 0.5 to 10 seconds.

3. The process of claim 1 wherein catalyst separated from hydrocarbon vapors is regenerated under conditions to remove carbonaceous material by burning with oxygen containing gas and thereby raise the temperature of the catalyst suitable for recycle to said riser conversion zone.

4. The process of claim 1 wherein the catalyst is regenerated in the presence of a carbon monoxide oxidation promoter.

5. The process of claim 1 wherein the catalyst in said downcomer passageway is caused to pass through a separate lower catalyst stripping zone countercurrent to stripping gas and stripped products with stripping gas are combined with recovered hydrocarbon vapors.

6. The process of claim 1 wherein a substantial hydrocarbon vapor-catalyst disengaging space is provided at said riser outlet beneath said radially extending catalyst collecting passageway and said catalyst downcomer passageway.

7. The process of claim 1 wherein said confined catalyst stream discharges downwardly from said confined passageway into the top of a vertically extending open ended catalyst confining downcomer zone adjacent said riser conversion zone and catalyst thus collected passes through said downcomer zone counter-current to stripping gas.

8. The process of claim 1 wherein said separated confined catalyst streams recovered from said riser conversion zone by said passageways are maintained separate from hydrocarbon vapors discharged from said riser during transfer to a catalyst stripping zone external to said catalyst downcomer passageway.

9. A method for separating a suspension of catalyst particles and gasiform material following traverse of a riser contact zone which comprises, discharging the suspension outwardly through openings beneath the upper closed end of said riser and beneath radially extending restricted catalyst collecting passageways open on the bottom side thereof and providing a substantially confined stream of collected catalyst particles generally separate from discharge gasiform material, said catalyst collecting passageways curved downwardly adjacent the outer end thereof to induce a downward moment on said confined catalyst stream in said passageway for discharge directly downwardly into the open upper end of a restricted catalyst downcomer passageway positioned to maintain catalyst so collected and directed out of further contact with discharged gasiform material, and recovering catalyst particles so collected from the bottom of said passageway for further use as desired.

10. The method of claim 9 wherein the gasiform material is a hydrocarbon product of catalytic conversion.

11. The method of claim 9 wherein the gasiform material is a gaseous combination product of catalyst regeneration.

* * * * *

UNITED STATES PATENT AND TRADEMARK OFFICE
CERTIFICATE OF CORRECTION

PATENT NO. : 4,219,407

DATED : August 26, 1980

INVENTOR(S) : JAMES H. HADDAD, SCOTT A. HEFFLEY and HARTLEY OWEN

It is certified that error appears in the above-identified patent and that said Letters Patent are hereby corrected as shown below:

Column 2, line 7, change "separated" to --separate--.

Column 4, line 2, "means" should read --mass--.

Column 5, line 60, "catalyst" should read --catalytic--.

Column 7, line 11, "or" should read --of--.

Column 7, line 28, after "lower", insert --bottom--.

Column 10, line 25, "This" should read -- Thus --.

Signed and Sealed this

Twenty-fifth Day of November 1980

[SEAL]

Attest:

SIDNEY A. DIAMOND

Attesting Officer

Commissioner of Patents and Trademarks